No. 682,971. Patented Sept. 17, 1901.
J. H. BRYSON.
ELECTROSTATIC MEASURING INSTRUMENT.
(Application filed Mar. 18, 1901.)
(No Model.)
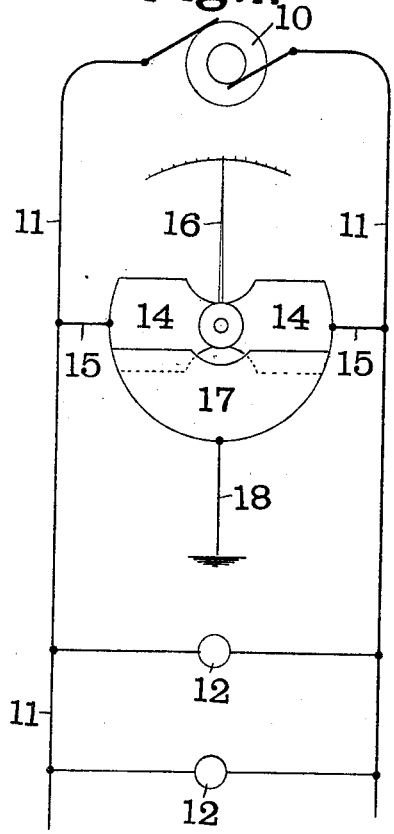
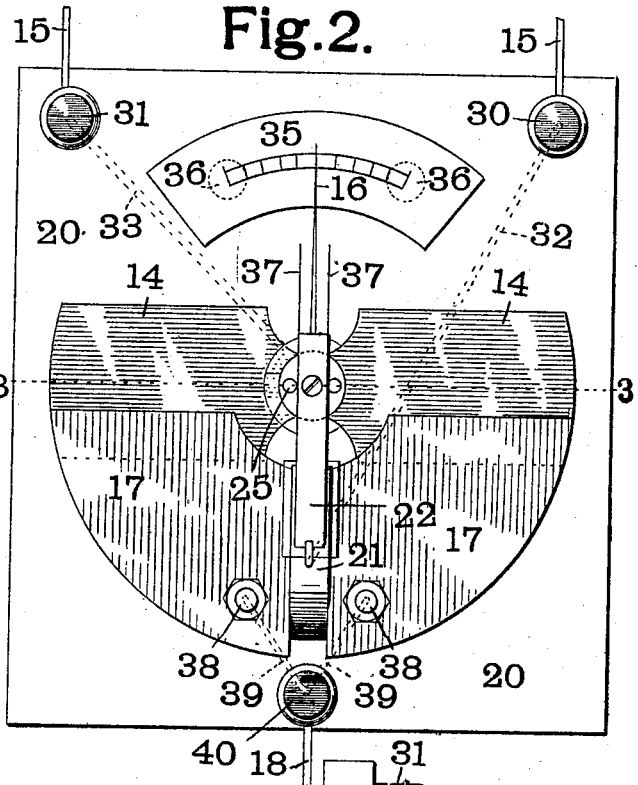
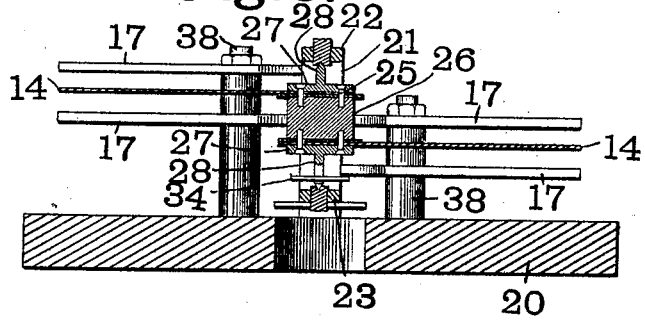
Witnesses
W. H. Alexander
J. R. Watkins
Inventor
James H. Bryson
By Attorneys

UNITED STATES PATENT OFFICE.

JAMES H. BRYSON, OF ST. LOUIS, MISSOURI, ASSIGNOR TO WAGNER ELECTRIC MANUFACTURING COMPANY, OF SAME PLACE.

ELECTROSTATIC MEASURING INSTRUMENT.

SPECIFICATION forming part of Letters Patent No. 682,971, dated September 17, 1901.

Application filed March 18, 1901. Serial No. 51,625. (No model.)

*To all whom it may concern:*

Be it known that I, JAMES H. BRYSON, a citizen of the United States, residing at the city of St. Louis, in the State of Missouri, have invented a certain new and useful Electrostatic Measuring Instrument, of which the following is such a full, clear, and exact description as will enable any one skilled in the art to which it appertains to make and use the same, reference being had to the accompanying drawings, forming part of this specification.

The object of my invention is to provide a new and improved electrostatic measuring or indicating instrument for the detection of grounds or other abnormal voltages upon electric circuits.

My invention consists primarily of the combination, with two movable inducing members insulated from each other and connected to the line-wires of a circuit, of a stationary member within the inductive influence of said movable members, said stationary member being under normal operating conditions of circuit neutral to said movable inducing members, and an indicator actuated by said movable members.

In the accompanying drawings, which illustrate an instrument made in accordance with my invention, Figure 1 is a diagram showing the instrument and its connections with a circuit and the ground. Fig. 2 is a front elevation of the instrument. Fig. 3 is a section on the line 3 3 of Fig. 2, and Fig. 4 is a side elevation.

Like marks of reference refer to similar parts in the several views of the drawings.

Referring first to Fig. 1, 10 is a generator from which lead the line-wires 11 of the circuit in connection with which the instrument is to be used. In the circuit 11 are lamps, motors, or other translating devices 12. 14 represents two movable inducing members which are insulated from each other and which are connected with the two sides of the circuit 11 by wires 15. Carried by the movable members 14 is an indicator 16. 17 is a stationary member which is arranged adjacent to the movable members 14 and grounded through a wire 18.

Referring now more particularly to Figs. 2, 3, and 4, 20 is a base, preferably of insulating material, by which is carried an L-shaped bracket 21, also preferably of insulating material. Carried by the bracket 21 are two metal bars 22 and 23, between which the movable members 14 are pivoted, as will be hereinafter described. Each of the movable members 14 consists of a thin wing of metal, preferably of light weight, such as aluminium. The two wings 14 are secured by means of screws or pins 25 to a hub 26 of insulating material. The screws or pins 25 also hold in place metal disks 27, which are provided with spindles 28, journaled in the bars 22 and 23. Carried by the base 20 are two binding-posts 30 and 31, to which are secured the wires 15, leading from the circuit 11. Leading from the binding-post 30 to the bar 22 is a wire 32. Leading from the binding-post 31 to the bar 23 is a wire 33. The charge from the wire 32 passes to the bar 22 and thence through the bearing to the outer wing or blade 14. The insulating-hub 26 prevents the charge from passing to the other blade. The charge from the wire 33 passes to the bar 23. From the bar 23 the charge may pass through the bearing to the spindle 28 and thence to the inner wing 14. In order to secure a better electrical connection than can be obtained through the bearing, I may use a spiral spring 34 for conveying the charge from the bar 23 to the spindle 28. The spring 34 also serves to hold the moving parts of the instrument in their normal position. A similar spiral spring may, if desired, be used at the opposite end of the bearing to convey the charge from the bar 22 to the adjacent spindle 28. The pointer 16 is secured to the outer spindle 28 and moves adjacent to a graduated scale 35, supported from the base 20 by posts 36. Secured to the bar 22 are two very thin and flexible L-shaped wires 37, which serve to confine the movement of the pointer 16 to the limits of the scale 35. The stationary electrical member 17 in the present form of instrument consists of four plates of metal supported, two on each side of the insulating-bracket 21, by means of metallic parts 38. The parts 38 are connected by means of wires 39 with a common binding-post 40. The four plates being thus connected together constitute, electrically considered, but a single member. The member 17 is kept at the potential of the earth by the wire 18, extending from the binding-post 40 to the ground.

In the operation of my instrument a static charge is imparted to the wings 14 in proportion to the voltage of the circuit to which they are connected. The stationary member 17 being grounded, there will be no movement of the wings 14 so long as the differences of potential between the sides of the circuit and the earth are the same. As soon, however, as by reason of a ground on one side of the system or otherwise the difference of potential between one side of the circuit and the earth becomes relatively greater than the difference between the other side and the earth the wing 14 connected with that side will be drawn down between the plates of the stationary member 17. This will deflect the pointer 16 toward one end of the scale 35, and thus indicate not only the occurrence of a ground and the side of the circuit at which it has occurred, but also by the amount of movement of the pointer approximately the extent of the ground.

It will be obvious to those skilled in the art that my invention may be used in connection with polyphase alternating-current circuits, as well as with circuits carrying single-phase currents only, such use requiring only such well-known and obvious modifications in the apparatus herein described as are necessary to adapt it to the varied conditions.

Having fully described my invention, what I claim as new, and desire to secure by Letters Patent of the United States, is—

1. In an electrostatic measuring or indicating instrument, the combination with a pair of movable blades carried by a common shaft and insulated from each other, of means for placing the opposite sides of a circuit in electrical communication with said blades, and a stationary member situated within the inductive influence of said blades and neutral with respect thereto under normal conditions of the circuit.

2. In an electrostatic measuring or indicating instrument, the combination with two movable members arranged opposite to and insulated from each other, of means for placing the opposite sides of the circuit in electrical communication with said blades, and a stationary member situated within the inductive influence of said movable members and neutral with respect thereto under normal conditions of the circuit.

3. In an electrostatic measuring or indicating instrument, the combination with a movable member consisting of two blades mounted on a common shaft, of an insulating-block between said blades and forming part of said shaft, means for connecting said blades with the opposite sides of a circuit through said shaft, and a stationary member situated within the inductive influence of said movable members and neutral with respect thereto under normal conditions of the circuit.

In testimony whereof I have hereunto set my hand and affixed my seal in the presence of two subscribing witnesses.

JAMES H. BRYSON. [L. S.]

Witnesses:
WM. T. JONES,
W. A. ALEXANDER.